Dec. 14, 1926.  
H. T. SCOTT  
1,610,977  
COUPLING  
Filed Dec. 3, 1924
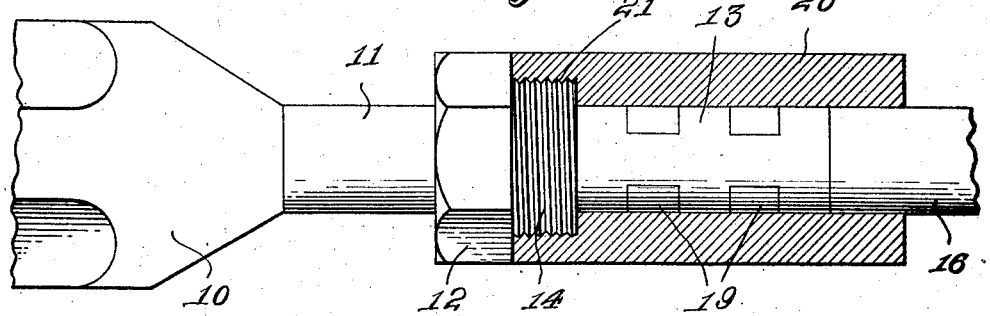
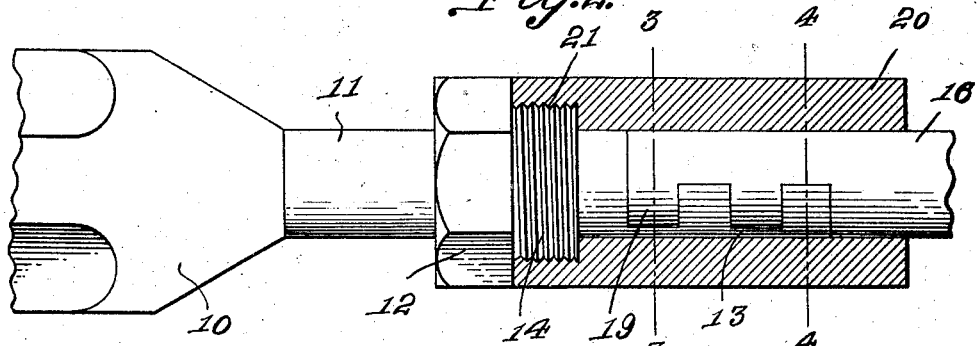
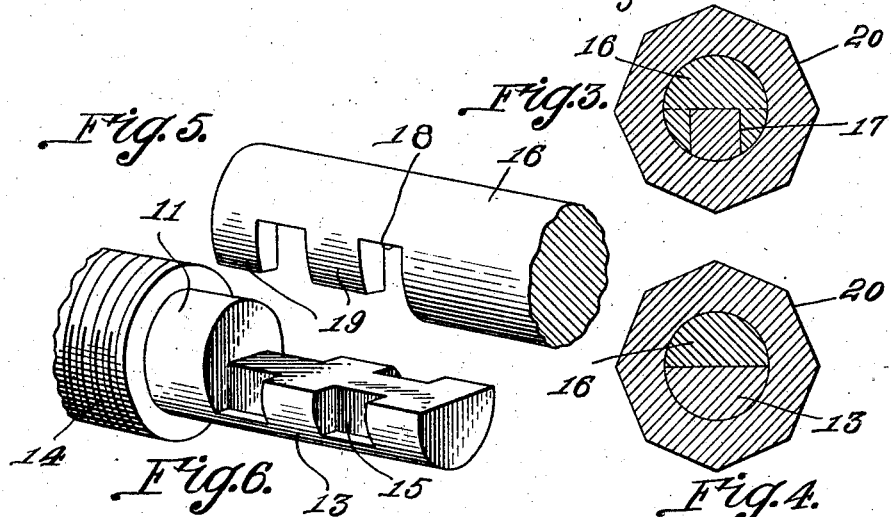
H. T. Scott  
INVENTOR Patented Dec. 14, 1926.

1,610,977

UNITED STATES PATENT OFFICE.

HENRY T. SCOTT, OF HUNTSVILLE, TEXAS.

COUPLING.

Application filed December 3, 1924. Serial No. 753,719.

This invention relates to improvements in couplings and has for an object the provision of means for quickly and securely connecting a drill bit or other tool to a stem in a manner to prevent accidental separation and probable loss of the tool.

With the above and other objects in view, the invention further includes the following novel features and details of construction, to be hereinafter more fully described, illustrated in the accompanying drawings and pointed out in the appended claims.

In the drawings:—

Figure 1 is an elevation partly in section illustrating the invention.

Figure 2 is a like view at right angles to Figure 1.

Figures 3 and 4 are sections taken respectively on the lines 3—3 and 4—4 of Figure 2.

Figure 5 is a detail perspective view of the coupling end of the stem.

Figure 6 is a like view of the recessed extension of the tool shank.

Figure 7 is a detail section taken transversely of the shank extension.

Referring to the drawings in detail wherein like characters of reference denote corresponding parts, the reference character 10 indicates a portion of a tool such as a drill bit, the shank of which is indicated at 11. The shank 11 is provided with a collar 12 and a reduced extension 13, while between this collar and the extension 13 is a threaded portion 14.

The extension 13 is substantially one-half the diameter of the shank 11 and is provided with spaced oppositely located recesses 15.

The reference character 16 indicates a portion of a drill stem whose extremity is provided with a longitudinally extending groove 17 which opens at the end of the stem. The opposite side walls of the grooves 17 are provided with spaced recesses 18 so as to provide oppositely located lugs 19. the latter being designed to be received within the recesses 15 so as to form an interlocking engagement between the shank and stem.

This interlocking engagement between the shank and stem will prevent relative longitudinal movement and in order to prevent relative lateral movement there is provided a sleeve 20 which is provided at one end with a threaded counterbore 21 which is adapted to engage the threaded portion 14 of the shank 11. The sleeve will thus be positioned over the interlocking ends of the stem and shank and will hold the same against accidental separation.

The invention is susceptible of various changes in its form, proportions and minor details of construction and the right is herein reserved to make such changes as properly fall within the scope of the appended claim.

Having described the invention what is claimed is:—

In a tool coupling, a shank, a collar, a reduced extension at one side of the collar, a threaded portion on the shank at the inner end of the reduced extension, a substantially semi-circular portion on the reduced portion formed with oppositely located recesses, a stem having a longitudinally disposed groove therein, with spaced recesses in the side walls of the groove forming oppositely located lugs adapted to be positioned in the spaced recesses of the reduced extension, a sleeve arranged over the interlocked portions of the shank and stem, said sleeve being formed with a threaded counter bore, adapted for engagement with the threaded portion of the shank and having its outer end abutting said collar.

In testimony whereof I affix my signature.

HENRY T. SCOTT.